US008634588B2

(12) United States Patent
Drenth

(10) Patent No.: US 8,634,588 B2

(45) Date of Patent: Jan. 21, 2014

(54) AUTOMATED MAIL INSERTING

(75) Inventor: Klaas Drenth, Drachten (NL)

(73) Assignee: Neopost Technologies, Bagneux (FR)

( * ) Notice: Subject to any disclaimer, the term of this patent is extended or adjusted under 35 U.S.C. 154(b) by 707 days.

(21) Appl. No.: 12/875,699

(22) Filed: Sep. 3, 2010

(65) Prior Publication Data

US 2011/0060450 A1 Mar. 10, 2011

(30) Foreign Application Priority Data

Sep. 4, 2009 (EP) .................................... 09169533

(51) Int. Cl.
*G06K 9/00* (2006.01)

(52) U.S. Cl.
USPC .......................................................... 382/101

(58) Field of Classification Search
None
See application file for complete search history.

(56) References Cited

U.S. PATENT DOCUMENTS

| | | | | |
|---|---|---|---|---|
| 3,484,100 | A | 12/1969 | Sather et al. | |
| 4,733,359 | A | 3/1988 | Luperti et al. | |
| 5,034,985 | A | 7/1991 | Keough | |
| 5,067,088 | A | 11/1991 | Schneiderhan | |
| 5,288,994 | A | 2/1994 | Berson | |
| 5,293,431 | A * | 3/1994 | Hayduchok et al. | 382/101 |
| 5,818,724 | A | 10/1998 | Brewster, Jr. et al. | |
| 5,934,875 | A | 8/1999 | Head | |
| 6,725,126 | B1 | 4/2004 | Doery | |
| 7,236,935 | B2 | 6/2007 | Haydt, III | |
| 8,335,022 | B2 * | 12/2012 | van den Berg | 358/474 |
| 2008/0130946 | A1 | 6/2008 | Wiersma | |
| 2008/0298635 | A1 | 12/2008 | West | |

FOREIGN PATENT DOCUMENTS

| | | | |
|---|---|---|---|
| EP | 0 556 922 | B1 | 8/1993 |
| EP | 1 791 080 | A1 | 5/2007 |
| EP | 1953703 | A1 | 8/2008 |
| EP | 1986160 | A2 | 10/2008 |

OTHER PUBLICATIONS

"ROI Marks the Spot", Postal ,Technology International, Mar. 2009, p. 63.

* cited by examiner

*Primary Examiner* — Claire X Wang

(74) *Attorney, Agent, or Firm* — Sughrue Mion, PLLC

(57) ABSTRACT

The present invention relates to a method for verifying the match of envelopes and documents in an automated matched mail system, by for a first envelope and a first document, scanning a face of the envelope and extracting envelope-addressee data indicative of the human-readable addressee information on the envelope; scanning the document so as to extract document data indicative of the content of the document; searching through the document data to locate a match to the envelope-addressee data and designating an area of interest within the document at the location at which the match occurs; for a further envelope and a further document, scanning a face of the envelope and extracting envelope-addressee data indicative of the human-readable addressee information on the envelope; scanning the document so as to extract document-addressee data at a location within the document corresponding to said designated area of interest and comparing the envelope-addressee data and the document-addressee data so as to verify the match of the further envelope and further document.

14 Claims, 4 Drawing Sheets

AUTOMATED MAIL INSERTING

The present invention relates generally to automated mail inserting, and more particularly, to automated mail inserting when there is a requirement that the documents and envelopes be matched.

In the context of the present invention, matched mail refers to the situation in which both the document to be sent and the envelope within which it is to be carried both separately bear addressee information. Matched mail does not refer to the situation in which only one of the document or envelope bear the addressee information, such as, for example, when the envelope is windowed and the addressee information on the document is aligned with the window.

Matched mail inserting systems are employed in many commercial spheres in which mass mailing is required, including, for example, the banking and advertising industries. Matched mail inserting systems are designed to achieve a high degree of synchronization between the physical delivery systems to try and ensure that the document and the envelope that are presented to an inserting station are indeed matched. However, especially in high throughput systems, disturbances, such as jamming, are prone to happening from time to time.

Accordingly, it has been found to be desirable to verify, either pre- or post-inserting, that the document and envelope are matched. This requires that the addressee information is read from the document. In order to read the addressee information, the area of interest in which the addressee information is presented must be identified. One known approach is to use special marks on the documents for this purpose, but this requires special applications to generate the marks and the marks occupy a portion of the document and detract from an ideal personalized presentation. Accordingly, other techniques for locating the area of interest including manual identification, heuristic algorithms based on standard templates, and neural net technologies have been applied.

With this background in mind, according to a first aspect, the present invention may provide a method for verifying the match of envelopes and documents in an automated matched mail system, by for a first envelope and a first document,

- scanning a face of the envelope and extracting envelope-addressee data indicative of the human-readable addressee information on the envelope;
- scanning the document so as to extract document data indicative of the content of the document;
- searching through the document data to locate a match to the envelope-addressee data and designating an area of interest within the document at the location at which the match occurs;

for a further envelope and a further document,

- scanning a face of the envelope and extracting envelope-addressee data indicative of the human-readable addressee information on the envelope;
- scanning the document so as to extract document-addressee data at a location within the document corresponding to said designated area of interest and comparing the envelope-addressee data and the document-addressee data so as to verify the match of the further envelope and further document.

The face of an envelope is by virtue of international postal regulations relatively uncluttered and has a predefined format. As a result, the technical cost, in terms of scanning and/or image processing resources, to extract envelope-addressee data from the face of an envelope is relatively low. The present invention leverages this relatively low technical cost in establishing a match between an envelope and a document. The present invention then also achieves further economy in the use of scanning and/or image processing resources by using data obtained in a previously verified match to streamline the process of verifying a later match.

In a preferred embodiment, the first and further envelopes are scanned only in the area dictated by international postal regulations and the further document is scanned only in the designated area of interest. In this way, both the time taken for scanning and the amount of data generated by the operation of scanning may be kept low. In an alternative embodiment, the whole of the further document may be scanned and the designated area of interest used to disregard irrelevant portions of the further document data.

According to a second aspect, the present invention may provide an automated matched mail inserting system comprising a plurality of processing stations, the system being operable, at one or more of said processing stations, for a first envelope and a first document, to

- scan a face of the envelope and extract envelope-addressee data indicative of the human-readable addressee information on the envelope;
- scan the document so as to extract document data indicative of the content of the document;
- search through the document data to locate a match to the envelope-addressee data and designate an area of interest within the document at the location at which the match occurs;

for a further envelope and further document, to

- scan a face of the envelope and extracting envelope-addressee data indicative of the human-readable addressee information on the envelope;
- scan the document so as to extract document-addressee data at a location within the document corresponding to said designated area of interest and compare the envelope-addressee data and the document-addressee data so as to verify the match of the further envelope and further document.

Further subsidiary features of preferred embodiments of the invention are described in the following description and defined in the appended claims.

Exemplary embodiments of the invention are hereafter described with reference to the accompanying drawings, in which.

In a matched mail inserting system, the document(s) to be sent and the envelope within which it is to be carried both separately bear the addressee information.

Figure 1:
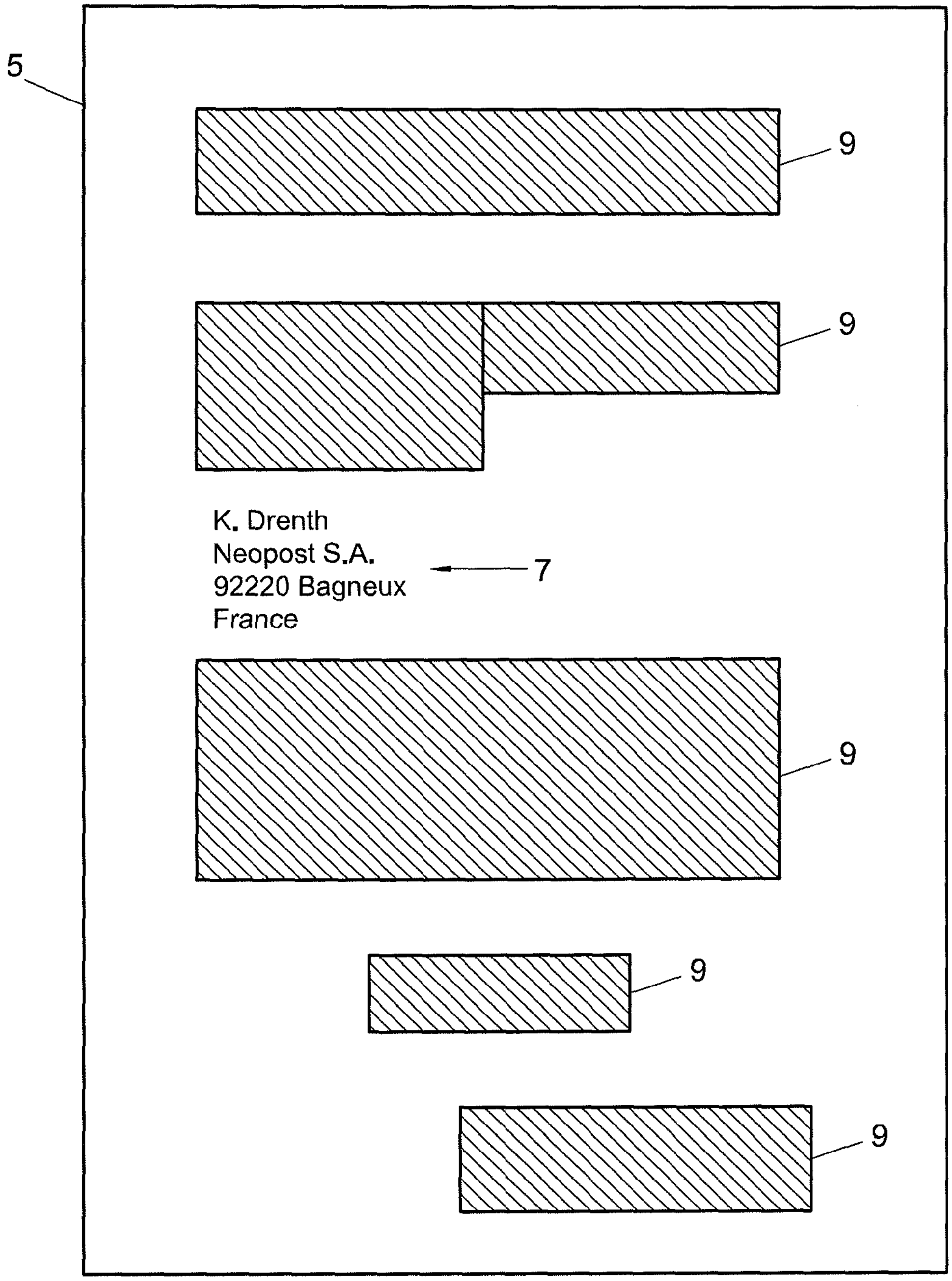
FIG. 1 shows a view of the face of a typical document that may form part of a matched mail piece.

FIG. 1 shows an example of a document 5 comprising a single sheet. The document 5 includes the addressee information 7 which comprises the name and address of the intended recipient of the document, and other content which is shown schematically as hatch-shaded boxes 9. In mass mailing applications, there is a need for the layout of the document to be completely unrestricted. This is particularly the case in the advertising industry where the personalization of material has proven to be a key factor in its effectiveness with the consumer. The requirement that the layout of the document be completely unrestricted, meaning that the addressee information might appear at any location on the sheet in any context has the consequence, however, that the technical cost, in terms of scanning and processing resources, of extracting the addressee information is high.

Figure 2:
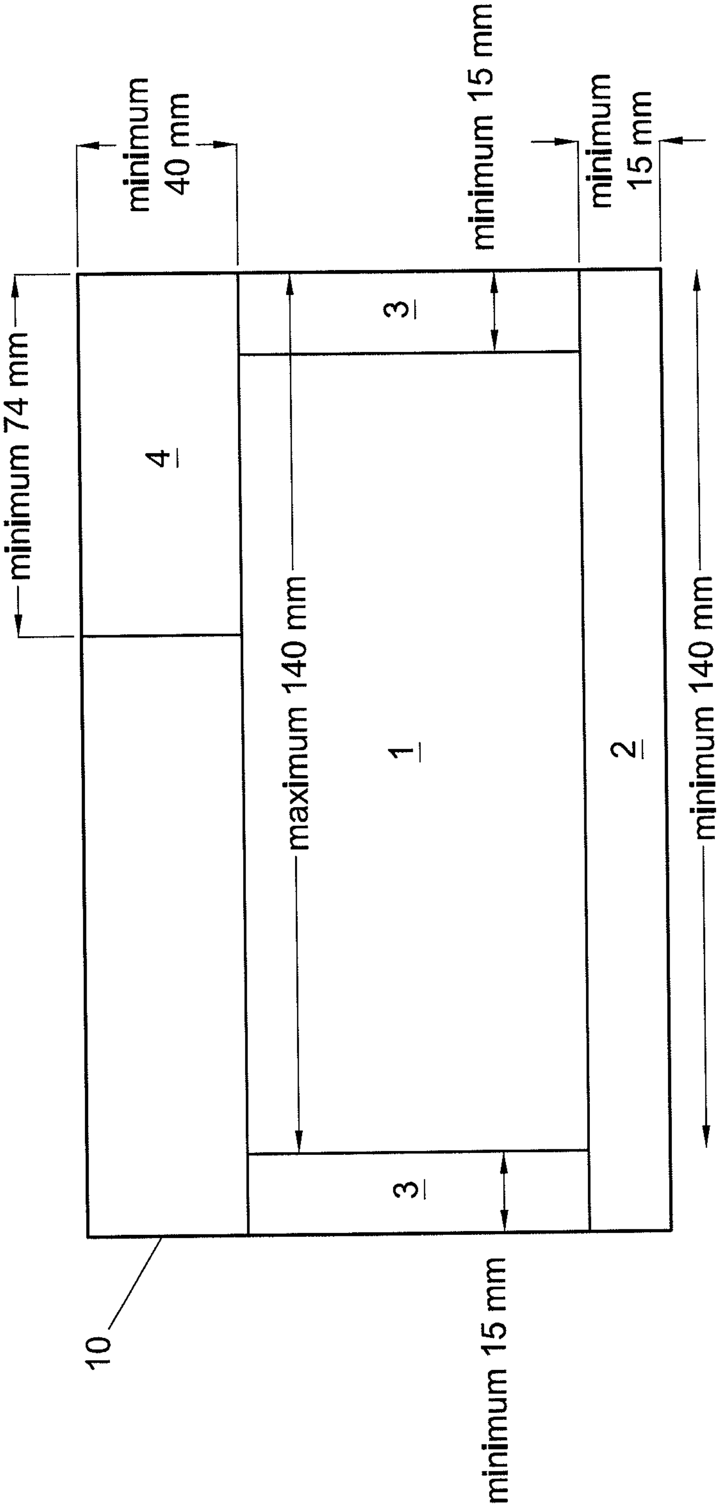
FIG. 2 shows a view of the face of an envelope that may form part of a matched mail piece.

The situation with regards to the envelope is, however, quite different. The Universal Postal Union (UPU) is an internal organization that sets postal standards which seek to ensure interoperability between the world's postal services. One such standard specifies the requirements for the position of an address on an envelope. These requirements are illustrated by FIG. 2 which shows the front face of an envelope 10. Area 1 is the area reserved for the addressee information. Area 1 must be at least 15 mm from the right-hand edge, at least 15 mm from the bottom edge, at least 40 mm from the top edge and at most 140 mm from the right-hand edge. Area 2 must be left blank and is used as an indexing or coding area. Both areas 3 must also be left blank and are used in detecting the addressee information. Area 4 is reserved for prepayment and cancellation indicia. In addition, no wording or extraneous matter is to appear to the right of the addressee information, below the addressee information, to the left of the addressee information, in an area at least 15 mm wide and running from the first line of the addressee information to the bottom edge of the envelope and 140 mm long starting from the right-hand edge of the item. National postal services are free to mandate additional requirements providing they are consistent with the minimum requirements of the UPU postal standards. As a result of these requirements, the technical cost, in items of scanning and processing resources, of extracting the addressee information from the envelope is much lower.

Figure 3:
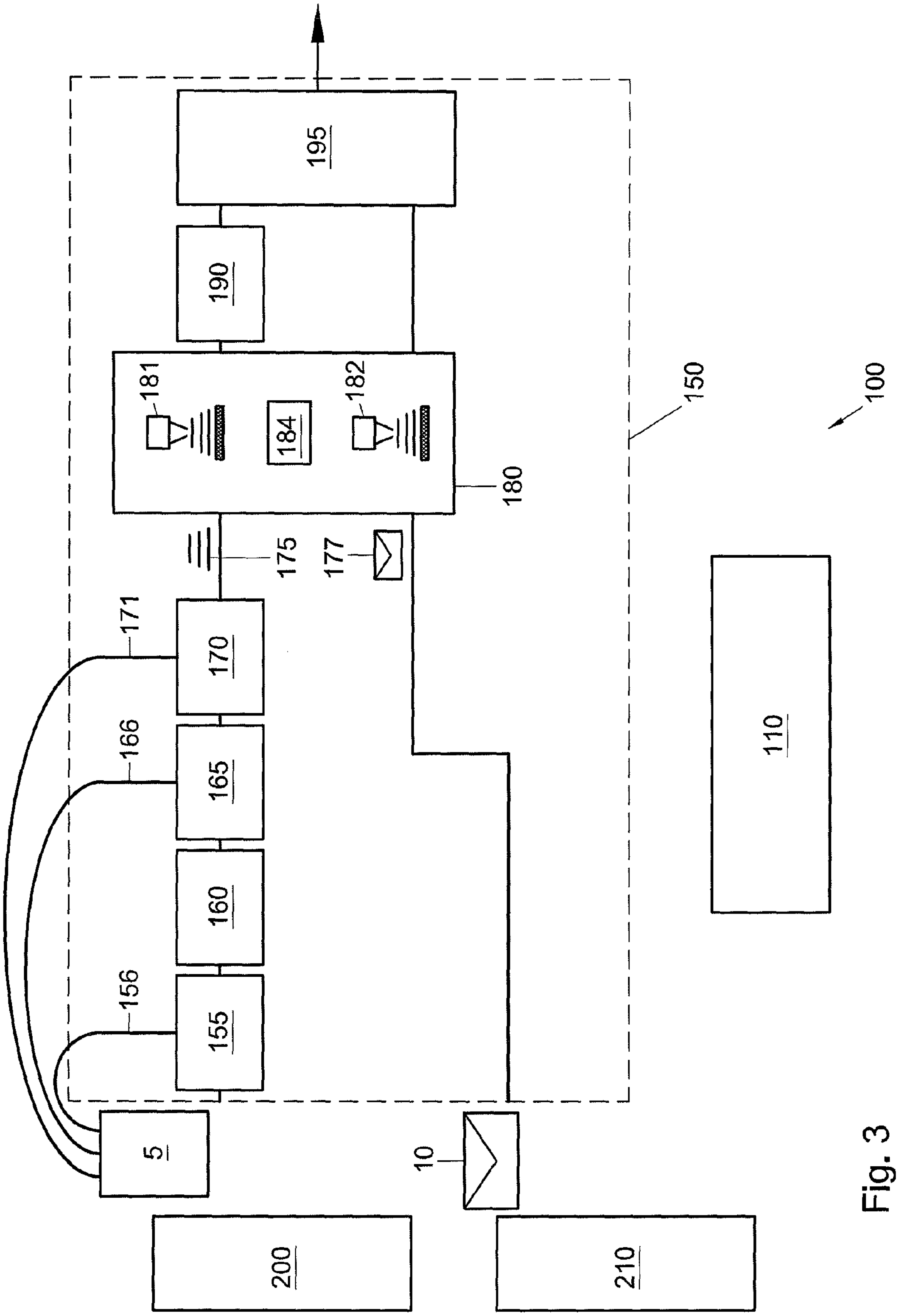
FIG. 3 shows a schematic matched mail inserting system.

FIG. 3 shows a schematic of matched mail inserting system 100. The system 100 comprises a document printer 200 for generating documents, an envelope printer 210 for printing addressee information onto the front face of an envelope, and a mail piece assembler 150 which receives the documents and envelopes and assembles matched mail pieces.

The documents that the printer 200 generates may comprise either a single sheet or extend over multiple sheets. Also, the documents may include addressee specific fields, such as the name and address of the addressee, or simply be a fixed body of content. As an example, a typical mail piece may comprise a first document in the form of a covering letter which includes the name and address of the addressee together with a second document in the form of an advertising pamphlet, the contents of which are addressee independent.

The system 100 further comprises a control unit 110 which coordinates the operation of the printers 200, 210, to ensure that the order of addresses match each other, and the assembler 150. In other embodiments, there may be some local connectivity between the printers 200, 210 to ensure that the order of addresses match each other. The assembler 150 comprises a plurality of successive processing stations. The processing stations are in the order of processing or downstream direction: a supply station 155; a collecting station 160; first and second supplementary supply stations 165, 170; a verification station 180; a folding station 190 and an insertion station 195. Stations 155, 160, 165, 170 together operate to form a stack of sheets which make up the document or documents for a single mail piece. As indicated by arrows 156, 166, 171, the printer 200 can supply documents selectively to stations 155, 165, and 170. The supply station 155 is constructed to supply separate sheets to the collecting station 160. At the collecting station 160, the sheets received from the supply station 155 may be collected into stacks of sheets, each stack being intended for a single mail piece. Each stack then passes through supplementary supply stations 165, 170 where, if desired, supplements may be added to the stacks. As a stack 175 exits the station 170, it comprises all the intended content for a single mail piece with the top sheet including addressee information.

The verification station 180 is supplied with the stack 175 and a presumed-to-be matched envelope 177. The verification station 180 comprises a first scanner 181 for scanning the top sheet of the stack 175, and a second scanner 182 for scanning the front face of the envelope 177. The verification station 180 comprises a local control unit 184 which controls the operation of the scanners and processes the scanned images.

The folding station 190 folds the constituent sheets of the stack 175 into a form for inserting into the envelope 177. The insertion station 195 performs the insertion of the folded stack into the envelope to produce a finished mail piece.

The system 100 outlined above can be made to operate in a number of modes as described below. For the purposes of clarity, the following description assumes that the mail piece is of the simplest kind comprising just a single sheet document and an envelope. However, it will be appreciated that the following description applies, mutatis mutandis, to instances where the mail pieces comprise multi-sheet documents and more than one document per mail piece.

Figure 4:
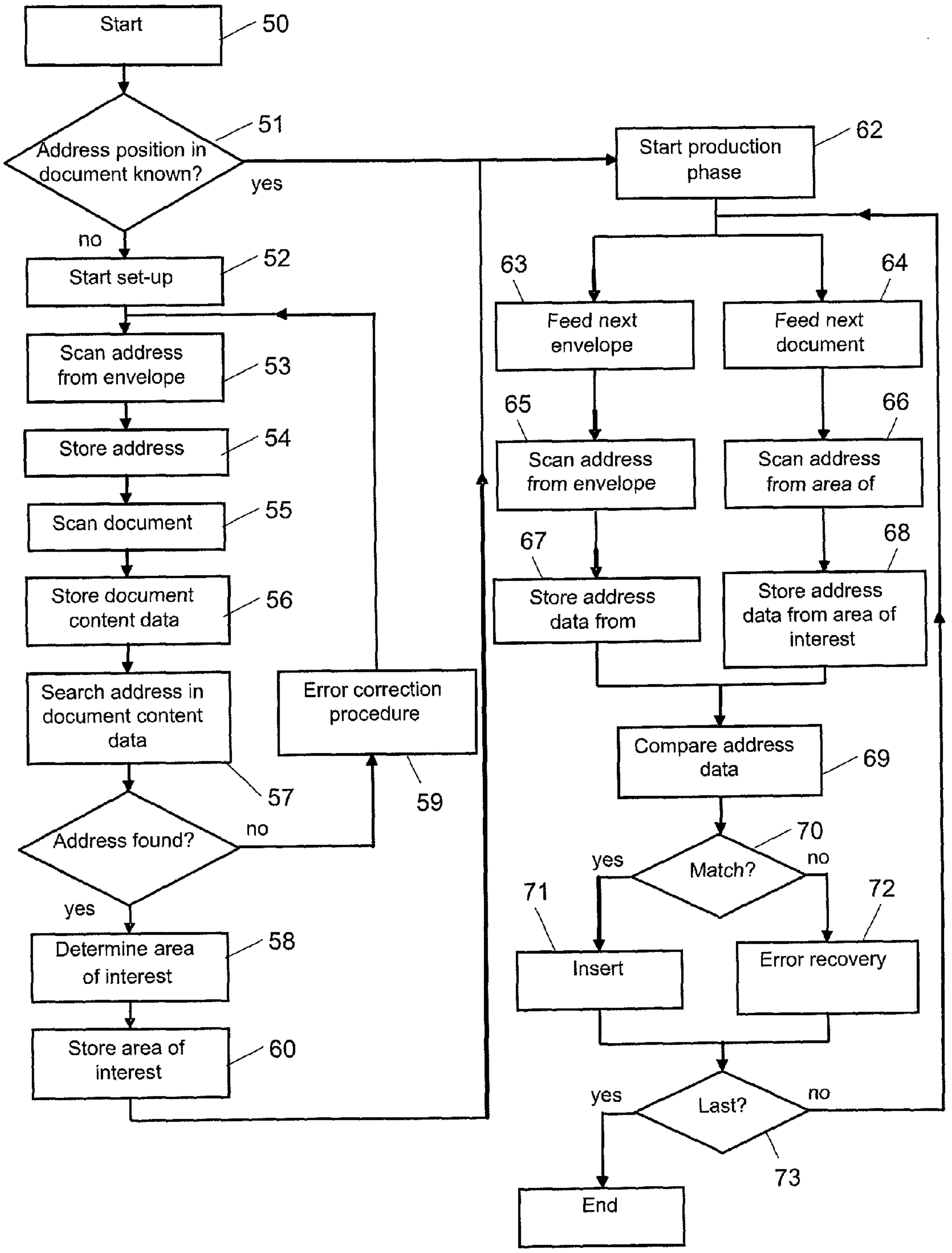
FIG. 4 shows a flow diagram showing the operation of the FIG. 3 system when operating in a batch mode.

In one mode of operation, the system 100 operates in a batch mode according to the process depicted in FIG. 4. At the start of a batch, step 50, the control unit 110, checks, at step 51, whether the position of the addressee information within the next batch of documents to be processed is known to it.

If the position of the addressee information is not known, a set-up or training procedure, steps 52-60, is commenced at step 52. An exemplary or training document is produced by the document printer 200 and an exemplary or training envelope is produced by envelope printer 210. The documents and envelope are fed to the mail piece assembler 150 and reach the verification station 180. At step 53, the scanner 182 scans the face of the envelope in the limited area dictated by the UPU standard. The local control unit 184 processes the data provided by the scan to generate data indicative of the addressee information on the envelope. Depending on implementation, the data may be image data directly extracted from the scan or may be in the form of a string of alphanumeric characters if the data is subsequently processed by optical character recognition software. Because of the UPU postal standards, it is not a difficult matter to extract this data. At step 54, the envelope-addressee data is stored. At step 55, the scanner 181 scans the whole front face of the document. The local control unit 184 processes the data generated by the scan to generate data indicative of the document content and stores this data at step 56. Again, depending on implementation, the data may be image data directly extracted from the scan or may be in the form of a string of alphanumeric characters if the data is subsequently processed by optical character recognition software. At step 57, the local control unit 184 performs a search through the document content data to find a match with the envelope-addressee data. If the envelope-addressee data and the document address data comprise text data, then this step merely involves the comparison of text strings. In one embodiment, the searching is initially based on the first n characters of the addressee information, and then, if a provisional match is found to be false, on a larger number of characters. On the other hand, if the envelope-addressee data and the document address data comprise image data, pattern recognition may be used. In one embodiment, artifacts of the envelope-addressee image data, such as the relative length of lines and/or words, may be used to make an initial rough search. Once a match seems to have been found, it may be confirmed by more detailed analysis of the scanned data or further scanning may be performed. If a match is found, i.e.

matching document-addressee data is found, then the location of the match within the document content data is used to designate an area of interest at step 58, within the document. Because of the unrestricted format of the document, a full search through the document is required.

The designation of the area of interest may be defined by a single pointer to an area within the document data where the document-addressee data begins. As an alternative, the designation of the area of interest may be defined by a pair of pointers indicating within the document data where the document-addressee data begins and ends, respectively. As a further alternative, the designation of the area of interest may defined by four or more pointers indicating a portion of data within the document data corresponding to a spatial region on the document within which the match was found. The specific implementation of the pointers depends on the nature of the envelope-addressee data and document content data as previously discussed.

At step 60, the designated area of interest is stored in the local control unit 184.

Since in this training phase, the stations 155, 160, 165, 170 are only handling the constituent documents of a single mail piece, it is unlikely that there will be any jamming, but should no match be found, an error correction procedure may be performed at step 59 and then steps 53 and the following steps repeated.

Having established the designated area of interest at step 60, the production phase is started at step 62. At step 63, successive envelopes are fed to the mail piece assembler 150. At step 64, successive documents are fed to the mail piece assembler 150. At step 65, the scanner 182 scans the face of the envelope with which it is currently presented in the limited area dictated by the UPU standard. The local control unit 184 processes the data provided by the scan to generate data indicative of the addressee information on the envelope. At step 67, the envelope-addressee data is stored. At step 66, the scanner 181 scans the front face of the document. Depending on implementation, the scanner 181 may scan the whole face of the documents and then use the stored/designated area of interest to narrow down the section of the scanned data for subsequent processing. Alternatively, the scanner 181 may scan only the area of the document corresponding to the stored/designated area of interest. In either case, the technical cost, in terms of scanning or processing, of extracting the document-addressee data from the document is reduced. At step 68, the local control unit 184 stores the extracted document-addressee data.

Since in the production phase, the stations 155, 160, 165, 170 are handling the constituent documents from a number of mail pieces simultaneously, if any jamming occurs it is possible that the physical synchronization of the system being orchestrated by the control unit 110 will breakdown.

Accordingly, at step 69, a comparison is made between the envelope-addressee data and the document-addressee data. Similar approaches to those discussed in relation to step 57 apply to step 69. If, at step 70, a match is confirmed, the envelope and document exit the verification station 180, the document is folded at the folding station 190, and, at step 71, the folded document inserted into the envelope at the inserting station 195 thereby completing the assembly of that mail piece. On the other hand, if the comparison, at step 69, reveals no match, then an error recovery process at step 72 is launched. Error recovery normally involves some human operator intervention. At step 73, the decision is made to continue the production phase until the batch has been completed.

The above-described batch mode of operation is suitable for many applications as it is a common requirement to process a large number of similar documents which are only lightly personalized, whereby the position of the document-addressee information is constant across a large number of successive, similar documents.

However, there are also applications in which there is much less consistency between documents, whereby the size of the document paper and/or the position of the document-addressee information within the document may vary from document to document, each document adopting one of a set of layout and/or paper size possibilities. For such applications, the system 100 operates in a dynamic mode.

In this mode, the local control unit 184 has a library of previously established areas of interest. When a comparison is made between the envelope-addressee data and the document-addressee data derived from a given previously established area of interest (analogous to step 69) and no match is found, the comparison is repeated using a further previously established area of interest taken from the library (depending on the implementation, this may require further partial scanning of the document) until a match is found. If no match is found, a full scan of the document is performed and new designated area of interest is added to the library (in a manner analogous to steps 53 to 60).

The system architecture shown in FIG. 3 is only one of the many possibilities suitable for carrying out methods according to the present invention. In one embodiment, the scanner 181 is located further upstream in the mail piece assembly process and is incorporated, for example, within the supply station 155 where it is used as part of the process for gathering and/or adding supplementary inserts/enclosures. For situations in which the system 100 is required to handle a batch in which the number of sheets is variable, in the production phase, it may be necessary to inspect each sheet in order to determine whether it belongs to the current or next mail piece. According to one approach, when there is no match between the envelope-addressee data and the data extracted from the sheet at the designated area of interest, a further determination is made whether the data extracted from the sheet is congruent with addressee information and the non-match resulted from an actual mis-match between addresses, or the non-match occurred because the scanned sheet was not the front sheet of a mail piece (and so is not expected to contain an address at the designated area of interest). This determination can be made by recognizing the presence of a ZIP code, optionally in a particular line of a block of text (usually the lowest or penultimate line) and/or by a sequence of a predetermined number of lines having lengths in a predetermined range. According to another approach, a determination can be made of whether the current sheet is the last sheet of the mail piece. This determination can be made by identifying within the sheet specific markings, like a specific OMR or bar code, indicating that the sheet is the last sheet of a mail piece or identifying secondary indicators like two identical digits separated by a "/" (n/n), a word "total" in an account statement, or the text "sincerely yours" or the like. This determination can be made before, and if positive instead of, scanning the designated area of interest. Alternatively, the determination can be made in addition to scanning the designated area of interest to provide an element of redundancy for checking purposes.

In further embodiments, each scanner may include its own dedicated local control unit. The central control unit 110 may play a role in processing the scanned data and determining a designated area of interest. In addition, station 155, 160, 165, 170 may be replaced with other document-assembling arrangements. The verification station 180 may be downstream of the folding station 190. The printers 200, 210 may be replaced with a single printer (not shown).

In the examples above, the addressee information on both the envelope and the document is in Roman characters and Arabic numerals. In other embodiments, this need not be the case and the addressee information may be in non-Roman characters including, but not limited to, for example, other alphabets like Cyrillic or Arabic, syllabaries like Hangul, or Sinographic logograms (as found in Chinese and Japanese). Similarly, non-Arabic numerals may be used. Accordingly, as used herein, the term 'text' should be construed to include such non-Roman characters and non-Arabic numerals.

The invention claimed is:

1. A method for verifying the match of envelopes and documents in an automated matched mail system comprising a plurality of processing stations, the method comprising:

for a first envelope and a first document, by a second scanner device, scanning a face of the envelope and, by one of a local control unit or a central control unit, extracting envelope-addressee data indicative of the human-readable addressee information on the envelope;

by a first scanner device, scanning the document and, by one of a local control unit or a central control unit, extracting document data indicative of the content of the document;

by one of a local control unit or a central control unit, searching through the document data to locate a match to the envelope-addressee data and designating an area of interest within the document at the location at which the match occurs;

for a further envelope and a further document, by said second scanner device, scanning a face of the envelope and, by one of a local control unit or a central control unit, extracting envelope-addressee data indicative of the human-readable addressee information on the envelope;

by said first scanner device, scanning the document and, by one of a local unit or a central control unit, extracting document-addressee data at a location within the document corresponding to said designated area of interest and, by one of a local control unit or a central control unit, comparing the envelope-addressee data and the document-addressee data so as to verify the match of the further envelope and further document.

2. A method as in claim 1, wherein the further document is scanned only in the designated area of interest.

3. A method as in claims 1, wherein the first and further envelopes are scanned only in the area dictated by the UPU standard.

4. A method as in claim 3, wherein the whole of the further document is scanned, and portions of the scanned data outside the designated area of interest are disregarded.

5. A method as in claim 1, wherein the envelope-addressee data and the document-addressee data comprise image data.

6. A method as in claim 1, comprising the step of further processing the data scanned from the envelope and the document.

7. A method as in claim 6, wherein the further processing comprises performing optical character recognition and the envelope-addressee data and the document-addressee data comprise text data.

8. A method as in claim 1, wherein the designated area of interest is defined by a single pointer to an area within the document data where the document-addressee data begins.

9. A method as in claim 1, wherein the designated area of interest is defined by a pair of pointers indicating within the document data where the document-addressee data begins and ends, respectively.

10. A method as in claim 1, wherein the designated area of interest is defined by four or more pointers indicating a portion of data within the document data corresponding to a spatial region on the document within which the match was found.

11. A method as in claim 1, wherein the envelope-addressee data and the document-addressee data comprise data relating to only one of the addressee name and the addressee address.

12. A method as in claim 1 in which said further documents comprise a variable number of sheets, wherein said comparison between the envelope-addressee data and the document-addressee data is performed for each sheet of the document, and if no match is found, making a further determination of whether the document-addressee data is congruent with addressee information.

13. A method of assembling a batch of mail pieces in an automated matched mail system including the match verification steps according to any preceding claim, wherein the area of interest established in respect of the first document serves as the designated area of interest for all the further documents in the batch.

14. An automated matched mail inserting system comprising a plurality of processing stations, the system being operable, at one or more of said processing stations, for a first envelope and a first document, to scan a face of the envelope and extract envelope-addressee data indicative of the human-readable addressee information on the envelope;

scan the document so as to extract document data indicative of the content of the document;

search through the document data to locate a match to the envelope-addressee data and designate an area of interest within the document at the location at which the match occurs;

for a further envelope and further document, to scan a face of the envelope and extracting envelope-addressee data indicative of the human-readable addressee information on the envelope;

scan the document so as to extract document-addressee data at a location within the document corresponding to said designated area of interest and compare the envelope-addressee data and the document-addressee data so as to verify the match of the further envelope and further document.

* * * * *